United States Patent [19]

Schreiber

[11] 4,060,486

[45] Nov. 29, 1977

[54] WASTE WATER AERATION DEVICE

[76] Inventor: August Schreiber, Bahnhofstr. 45, 3001 Hannover-Vinnhorst, Germany

[21] Appl. No.: 670,223

[22] Filed: Mar. 25, 1976

[30] Foreign Application Priority Data

Mar. 26, 1975 Germany ............................ 2513547

[51] Int. Cl.$^2$ ............................ C02C 1/12; B01F 3/04

[52] U.S. Cl. ...................................... 210/220; 261/77; 261/122

[58] Field of Search ................ 210/63 R, 220, 221 R; 261/77, 122, 124

[56] References Cited

U.S. PATENT DOCUMENTS

| | | | |
|---|---|---|---|
| 1,599,561 | 9/1926 | Emery | 261/122 X |
| 3,063,689 | 11/1962 | Coppock | 261/122 X |
| 3,186,644 | 6/1965 | Ross et al. | 261/124 X |
| 3,206,178 | 9/1965 | Lamb | 261/122 |
| 3,432,154 | 3/1969 | Danjes | 261/122 |
| 3,525,685 | 8/1970 | Edwards | 261/124 X |
| 3,642,260 | 2/1972 | Danjes et al. | 261/122 |
| 3,880,965 | 4/1975 | Dudis et al. | 261/122 |

FOREIGN PATENT DOCUMENTS

| | | |
|---|---|---|
| 6,751,014 | 1/1969 | Germany. |
| 2,035,651 | 1/1972 | Germany. |

*Primary Examiner*—Frank A. Spear, Jr.
*Assistant Examiner*—Robert H. Spitzer
*Attorney, Agent, or Firm*—Watson, Cole, Grindle & Watson

[57] ABSTRACT

A device in the form of an air distributor container is provided for effecting intermittent aeration of waste water, with several of such containers being arranged beneath the water level and connected with an air intake. Each container comprises a tube-like support and an air distributor foil covering such support and having fine air exit openings therein which are opened during the aeration process by the air introduced through the intake, and which close once the air intake is discontinued. Each container comprises an oval barrel jacket, serving as the support and having upper and lower outwardly arched walls. A plurality of lateral air passage openings are located in the upper wall of the barrel jacket and extend along opposite longitudinal edges thereof. Cover plates air-tightly close opposite ends of the barrel jacket, and one of the plates contains an air intake opening. An elongated tie rod extends axially over the entire length of the container and through holes in the cover plates for securing them in place and for further strengthening the container. The foil is connected to the jacket at its opposite ends in an air-tight manner and is stretched over the upper wall including the air passage openings, with the exit openings of the foil lying inwardly of such openings. Accordingly, an interspace is defined between the foil and the upper wall during air intake as the foil is caused to raise from the barrel jacket to a level higher than the air passage openings.

7 Claims, 4 Drawing Figures

WASTE WATER AERATION DEVICE

BACKGROUND OF THE INVENTION

This invention relates to a device, in the form of an air distributor container, for effecting intermittent aeration of waste water, several of such air distributor containers being arranged beneath the water level and connected with an air intake, each container comprising a tube-like support and an air distributor foil spanning such support and having fine air exit openings therein which are opened during the aeration process by the air introduced through the intake, and which close once the air intake is discontinued.

A device of this general type is described in German application Pat. Ser. No. 1,071,054, in which the air distributors comprise a support having a relatively pronouned arched cross-section and an air hose having air exit openings surrounding the support. With the use of such device, there is the danger that waste water will penetrate into the air hose, since it is impossible to avoid alignment between the small air exit openings of the air hose and the large air intake openings of the support body. Therefore, if the air exit openings do not properly close, waste water can enter into the support as well as into the intake lines.

German application Pat. Ser. No. 1,784,398 also describes a device of this general type having air hoses, in which each air hose is held by a support member at its longitudinal edges, and is designed to be flat and flexible in such a manner that, in the absence of or during a low degree of internal pressure, its top and bottom tightly come together. However, the air distributors are quite heavy, since the support members holding the air hoses must be relatively strong and therefore heavy, in order to be able to withstand the mechanical stresses during operation. Furthermore, it is difficult to manufacture the flexible, membrane-like material for the air hoses with such an even quality that, upon discontinuation of the air intake into the air hoses, a secure seal of the air exit openings is assured against the undesired penetration of waste water into the air hose. This, however, is of considerable importance for devices of this type, as they are frequently operated intermittently, i.e., with a discontinuation of the air intake.

To avoid these difficulties, German application Pat. Ser. No. 2,035,651 describes a device in which each air distributor comprises a support and a prestressed air distributor foil with air exit openings and a leakproof base against which the air distributor foil fits air-tightly during no or very little air intake. The support is designed as having a lower, arched plastic plate that serves as the base, over which the air distributor foil with the pierced air exit openings is stretched and is attached in an air-tight manner between a connecting strip mounted on the circumference of the plastic plate on the bottom and a frame, with a connecting strip also being provided on the top. For such a device, however, it has been found that the plastic plate, from a strength standpoint, cannot be easily produced in such a manner as to avoid deformation of the air distributors. In addition, production of the separate parts and the manner of effectively sealing against penetrating waste water is also difficult, because the sealing surfaces are located at the highest point of the foil to be rendered impervious. This requires s shutting off of the air exit openings by air against air. And, if any defects are present, the entire air space beneath the raised air distributor foil fills with waste water and sludge, thereby blocking the exit openings when air is again taken in.

SUMMARY OF THE INVENTION

It is an object of the invention to improve upon a device of the aforementioned type with respect to its static strength and its sealing effect against the penetration of waste water upon discontinuation of the air intake, and with respect to the production and installation costs.

The drawbacks of the prior art are solved according to the invention in that each air distributor container comprises an oval barrel jacket, serving as the support, and having lateral air passage openings along only the upper side thereof along its opposite longitudinal edges. The jacket has upper and lower outwardly arched walls and cover plates connected in an air-tight manner therewith at opposite ends. At least one of the cover plates has an air intake opening, and both plates have an opening for inserting a tie rod that extends axially throughout the entire length of the air distributor container. The upper side of the air distributor container is covered by an air distributor foil which likewise covers the lateral air passage openings, the air distributor foil being connected in an air-tight manner with the oval barrel jacket by means of clamping rings at opposite ends of the air distributor container, whereby the interspace created during air intake by the raising of the air distributor foil from the barrel jacket is located at a level higher than the lateral air passage openings.

With an air distributor designed in this manner, in accordance with the invention, the oval barrel jacket and the cover plates mounted at its opposite ends, and with the tie rod passing through the cover plates, results in an air distributor container having a relatively greater static strength but which, when made of plastic for example, is nonetheless substantially light-weight. The oval barrel jacket can be attached to a rectangular air intake by means of the tie rod, or it can be joined to an aerator by means of a T-branch. Moreover, several air distributors can also be connected one behind the other without requiring additional connecting pipes.

The foil may be in the form of a casing which encircles the entire extend of the oval barrel jacket. And, the upper arch of the barrel jacket is of a less curvature than the lower arch thereof. The casing which is stretched over the barrel jacket, with its upper section serving as an air distribution means, rises above the upper arch of the barrel jacket upon an intake of air, while the lower section of the casing, as a result of the pull exerted upon it by the air from above, is caused to lie firmly against the lower, more markedly curved arch of the barrel jacket, so that the air can only exit on the upper side through the air exit openings of the air distributor foil.

To avoid the air from being impeded between the air distributor container and the air distributor foil, the air distributor container is so designed that the crown of the upper arch is elevated from the longitudinal edges of the upper arch, and horizontal or nearly horizontal portions extend inwardly from such edges and contain the air passage openings. Such portions are sufficiently wide that the stretched air distributor foil remains out of contact therewith, thereby avoiding any greater air resistance through the air passage openings during air intake. Moreover, the air passage openings of the air distributor container slope toward the median longitudinal plane of the air distributor container and thereby toward the highest point of the raised air distributor foil.

BRIEF DESCRIPTION OF THE DRAWINGS

The invention will become more apparent from the following detailed description of the invention when taken in conjunction with the accompanying drwings wherein.

DETAILED DESCRIPTION OF THE INVENTION

Figures 1, 2, 3, 4:
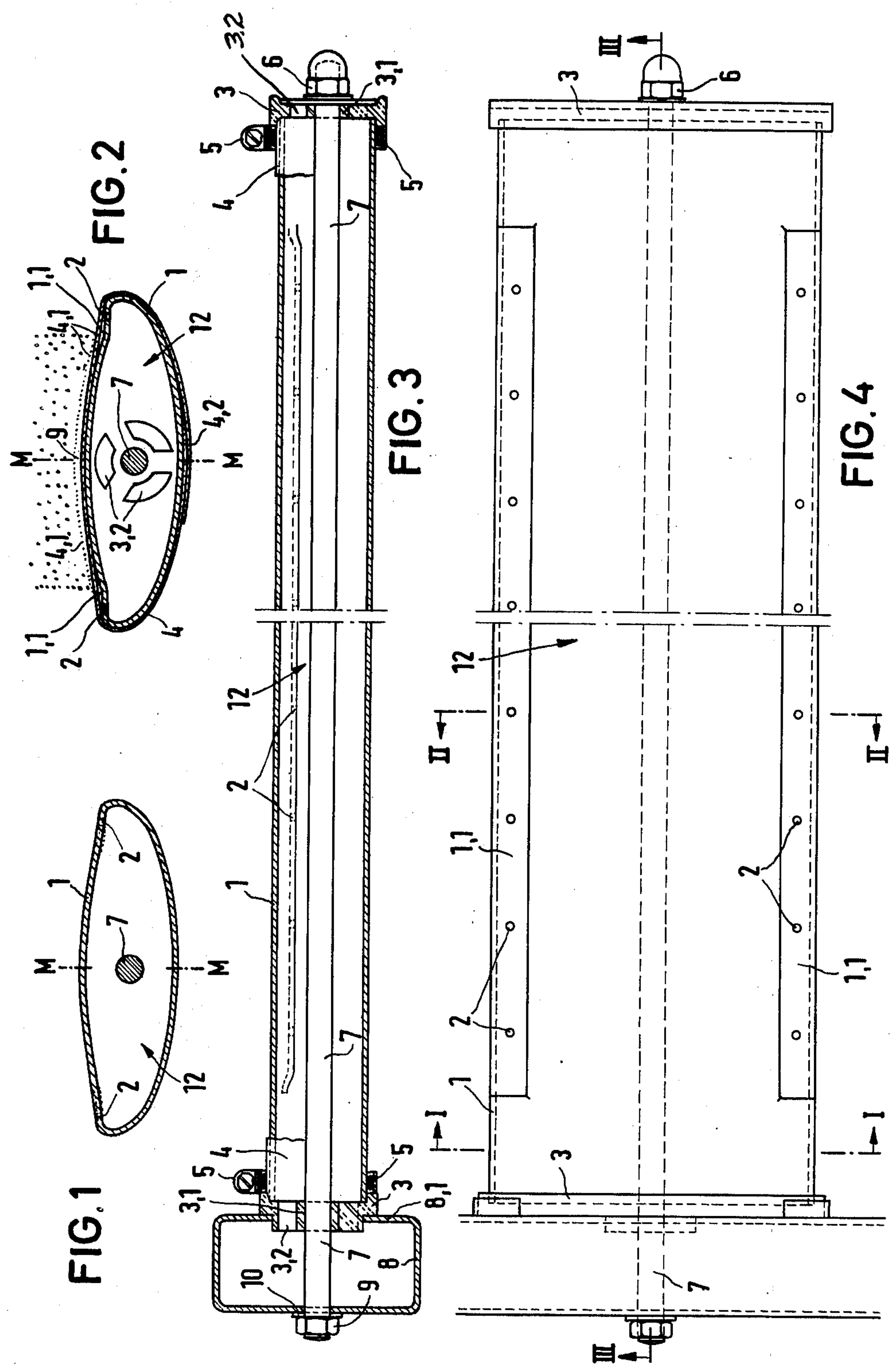
FIG. 1 is a cross-sectional view of an air distributor container according to the invention taken along line I—I of FIG. 4.
FIG. 2 is a cross-sectional view of the present air distributor container taken along line II—II of FIG. 4.
FIG. 3 is a longitudinal sectional view of the air distributor container taken along line III—III of FIG. 4.
FIG. 4 is a top plan view of the air distributor container without the air distributor foil.

Turning now to the drawings wherein like reference characters refer to like and corresponding parts throughout the several views, the air distributor comprises a barrel jacket 1 of oval cross-section, the lower arch of which is preferably of greater curvature than the upper arch. A plurality of air passage openings 2 are located in rows along substantially the entire length at both longitudinal edges of the upper arch of oval barrel jacket 1. Cover plates 3, which may be of hard plastic material, close both ends of barrel jacket 1, the cover plates being held together air-tightly with both the oval barrel jacket and an air intake tube 8 by means of a tie rod 7 extending longitudinally through the jacket. As can be seen in FIGS. 3 and 4, a tightening nut 6 is threaded onto the right end of tie rod 7 for this purpose, and bears against cover plate 3 through a suitable washer. Similarly, in accordance with FIG. 3, a tightening nut 9 is threaded onto the left end of tie rod 7 and bears against a washer 10 to thereby hold both the left cover plate and tube 8 in place as wall 8.1 of the tube bears against the left cover plate. Each cover plate has an open 3.1 for the axial mounting of tie rod 7 with air intake tube 8, and air entry openings 3.2 for the entry of air from air intake tube 8 into the oval barrel jacket. Opening 3.2 in the right cover plate is shown closed in FIG. 3 by a washer, although it is available for alternate use. The oval barrel jacket with cover plates 3 form an air distributor container 12, through the entire length of which tie rod 7 extends. And, one of the cover plates is provided with a threaded collar for securing it to air intake tube 8.

Air distributor container 12 is covered with an air distributor foil 4, which extends along the longitudinal edges over lateral air passage openings 2 of the oval barrel jacket, so that when air is introduced into air distributor container 12, it can stream through air passage openings 2 into an interspace 9 between air distributor foil 4 and the upper arch of barrel jacket 1. Air distributor foil 4 can be designed in the form of a hose casing that is drawn in its entirety over the barrel jacket under tension, as shown in FIG. 2. Or, air distributor foil 4 can be formed from a rectangular sheet wrapped around the entire oval girth of barrel jacket 1 and fastened under tension along the lower arch thereof by means of a spline engaged with a groove or keyway (not shown). The air distributor foil may also be welded at the lower arch into the form of a hose, as indicated at 4.2 in FIG. 2.

Located slightly inwardly of and between lateral air passage openings 2 at both longitudinal edges of the upper arch of the barrel jacket, air distributor foil 4 has fine exit openings 4.1 that may be formed by piercing the foil from the inside thereof using fine needles. Air distributor foil 4 is made of a fine plastic material that is coated with a flexible plastic on the side facing barrel jacket 1. At opposite ends of air distributor container 12, the air distributor foil is fastened airtight to oval barrel jacket 1 by means of tightening rings 5.

As shown in FIG. 2, lateral air passage openings 2 of air distributor container 12 lie slightly beneath air exit openings 4.1 of air distributor foil 4. Further, FIG. 2 shows that interspace 9 that forms upon air intake when the foil is lifted away from barrel jacket 1 lies higher, as in dotted outline, than lateral air passage openings 2.

The upper arch of oval barrel jacket 1, in accordance with FIG. 2, has a horizontal or nearly horizontal portion 1.1 containing air passage openings 2 in the area of the two longitudinal edges, each such portion being of a width such that air distributor foil 4 which is stretched by the intake of air will not touch the upper arch in the area of portions 1.1, to thereby avoid greater air resistance through the air passage openings during air intake.

As shown in FIGS. 1 and 2, air passage openings 2 of air distributor container 12 slope upwardly toward median longitudinal plane M—M of air distributor container 12, or toward the highest point of the raised air distributor foil 4.

If air distributor foil 4 is damaged or its air exit openings 4.1 become blocked by a particular type of sewage being aerated and will not open even when excess pressure is applied, then all the air distributor containers of a clarification plant can be used for medium bubbly waste water aeration after air distributor foil 4 is removed, as lateral air passage openings 2 of oval barrel jacket 1 are so small that the air enters the waste water in the form of a medium bubbly aeration.

The air distributor foil may be of a material having a fine-spun outer surface such as plastic, and a flexible plastic inner lining. It will then be sufficiently flexible for producing an increased sealing effect.

The foil can be made into an air distributor by simply piercing it from the inside to produce fine air exit openings, thereby assuring a long life for the air distributor even during intermittent operation of the device, without the possibility of the air distributor foil becoming clogged with dirt. The numerous small air exit openings of the air distributor foil will allow the air introduced between the air distributor foil container and the air distributor foil to exit into the waste water in the form of fine bubbles. In the absence of any air intake, the air distributor foil, with closed air exit openings, is pressed back against the oval barrel jacket of the air distributor container by the water pressure, thus closing the air distributor container's air passage openings and shutting off the penetration of waste water or waste water activated sludge mixtures into the air distributor container or into the devices for compressed air intake or production-connected in series thereto.

The air distributor foil needs to be only somewhat wider than the distance between the lateral air passage openings arranged along both longitudinal edges of the oval barrel jacket. However, it can also be designed as a casing encircling the entire oval circumference of the barrel jacket, the casing having the fine air exit openings only in its upper section between the lateral air passage openings of the barrel jacket. Such a casing may be in the form of a hose drawn entirely over the oval barrel jacket, or it can be formed of a rectangular sheet disposed about the oval barrel jacket with the air exit openings on the external side of the air distributor container and attached to the lower arch by means of a longitudinally extending spline located within a groove or keyway in the lower arch. The hose could also be attached by means of such spline. If the casing is in the form of a hose, the oval barrel jacket or the hose can be conical on one end to effect easier installation and clamping of the hose. Finally, both ends of the air distributor foil, after spanning the lower arch, can be connected firmly and air-tightly together, e.g., by means of welding, into a hose that is open on both sides.

When the air distributor foil, in accordance with the invention, raises by the air overpressure that forms upon air intake, it raises sufficiently that the upper arching of the air distributor foil moves out of contact with the upper arching of the jacket so that the air can enter unimpeded therebetween.

Since the air distributor foil rises upon air intake over the entire area of the upper arch of the air distributor container and the container's lateral air passage openings lie lower than the hollow space between the upper arch and the air distributor foil, the air between the upper arch and the air distributor foil cannot escape so long as the lateral air passage openings are shut off air-tight in the absence of air by the application of the air distributor foil with its closed air exit openings. A sealing off of these lateral air passage openings is especially assured not so much for the sealing off of air against air, but rather water against water, inasmuch as the air exit openings of the air distributor foil lie higher than the lateral air passage openings in the upper arching of the air distributor container.

Obviously, many modifications and variations of the present invention are made possible in the light of the above teachings. It is therefore to be understood that within the scope of the appended claims the invention may be practiced otherwise than as specifically described.

What is claimed is:

1. A device for the intermittent aeration of waste water which comprises an elongated air supply container, said container consisting of connected upper and lower outwardly arched walls enclosing an air passage chamber therebetween, said upper wall consisting of an outwardly arched central portion and opposite, substantially horizontal portions adjacent the two longitudinal edges thereof in the elongated direction of said air supply container, said lower arched wall being connected to the opposite, substantially horizontal portions of said upper wall, means forming a plurality of air passage openings in said opposite, substantially horizontal portions of said upper wall, means closing the opposite ends of said elongated air supply container, means for intermittently supplying air to the air passage chamber in said elongated air supply container; a flexible air distribution casing stretched over said upper wall of said air passage chamber so as to cover said outwardly arched central portion of said upper wall in an air-tight fashion but retain respective free air spaces between said opposite, substantially horizontal portions of said upper wall and said flexible air distribution casing, means forming air outlet openings in said air distribution casing, said air outlet openings being positioned in said casing adjacent said arched central portion of said upper wall and between said opposite longitudinal rows of air passage openings in said opposite, substantially horizontal portions of the upper wall of said elongated container, whereby upon the supply of air to the air passage chamber in said container, the air passes through said air passage openings in said opposite, substantially horizontal portions of said upper wall to fill said free air spaces with no resistance and thereafter lift said air distribution casing away from said container, and finally pass through said air outlet openings of said casing into surrounding waste water.

2. The device of claim 1, wherein a tie rod positioned within the elongated air supply container connects said means closing the opposite ends of the elongated container, said closing means comprising cover plates.

3. The device of claim 2, wherein said means for intermittently supplying air to said elongated air supply container comprises means forming an opening for compressed air in at least one of said cover plates.

4. The device of claim 3, wherein locking rings are positioned around said elongated container adjacent the opposite ends thereof, and wherein said air distribution casing is connected to said locking rings to form an air-tight seal between the edges of the casing and the walls of the elongated container.

5. The device of claim 4, wherein the outlet openings of the air distribution casing are smaller in size than the air passage openings in the opposite, substantially horizontal portions of said upper wall of said elongated casing, and wherein upon the cessation of air flow through said means for intermittently supplying air to said elongated air supply container, the air distribution casing again becomes pressed against the arched central portion of said upper wall of said elongated container, thus closing the outlet openings in the air distribution casing.

6. An apparatus for the intermittent aeration of waste water wherein said apparatus comprises several devices as defined in claim 1 with means interconnecting the several elongated containers for the passage of air therebetween.

7. An air distributor device in the form of an air distributor container connected with an air intake for the intermittent aeration of waste water, said container comprising an elongated tube-like support, an air distributor foil having fine exit openings therein and covering said support in such a manner that said openings are opened during an aeration process by air introduced through said air intake and are closed when the air through said intake is discontinued; characterized in that said air distributor container comprises an oval barrel jacket serving as said support and having upper and lower outwardly arched walls, a plurality of lateral air passage openings located in said upper wall and extending along opposite longitudinal edges thereof, cover plates closing opposite ends of said barrel jacket in an air-tight manner, one of said plates having an air intake opening therein, and both said plates having holes therein, an elongated tie rod extending axially over the full length of said container and through said holes, said foil being stretched over said upper wall including said air passage openings, said exit openings in said foil lying inwardly of said air passage openings, claimping rings connected said foil to said jacket in an air-tight manner at said opposite ends thereof, whereby an interspace is defined between said foil and said upper wall during an intake as said foil is caused to raise from said barrel jacket to a level higher than said air passage openings, wherein said upper arch of said oval barrel jacket has substantially horizontal portions containing said air passage openings adjacent said longitudinal edges, said portions each being of a width such that said stretched air distributor foil is out of contact with said portions to thereby avoid air resistance through said air passage openings during air intake.

* * * * *